US012335572B2

(12) United States Patent
Bao

(10) Patent No.: US 12,335,572 B2
(45) Date of Patent: Jun. 17, 2025

(54) METHOD AND APPARATUS FOR PLAYING BACK VIDEO AT MULTIPLE-SPEED, ELECTRONIC DEVICE AND STORAGE MEDIUM

(71) Applicant: Beijing Zitiao Network Technology Co., Ltd., Beijing (CN)

(72) Inventor: Honglai Bao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/253,764

(22) PCT Filed: Nov. 2, 2021

(86) PCT No.: PCT/CN2021/128265
§ 371 (c)(1),
(2) Date: May 19, 2023

(87) PCT Pub. No.: WO2022/105597
PCT Pub. Date: May 27, 2022

(65) Prior Publication Data
US 2024/0305860 A1 Sep. 12, 2024

(30) Foreign Application Priority Data
Nov. 20, 2020 (CN) .......................... 202011310156.1

(51) Int. Cl.
*H04N 21/472* (2011.01)
*H04N 19/169* (2014.01)
(Continued)

(52) U.S. Cl.
CPC ..... *H04N 21/47217* (2013.01); *H04N 19/172* (2014.11); *H04N 19/188* (2014.11); *H04N 19/70* (2014.11)

(58) Field of Classification Search
CPC .......... H04N 21/47217; H04N 19/172; H04N 19/188; H04N 19/70
See application file for complete search history.

(56) References Cited

U.S. PATENT DOCUMENTS 9,066,131 B1   6/2015  Arsenault
2007/0058926 A1*  3/2007  Virdi .................. H04N 21/4122
386/346

(Continued)

FOREIGN PATENT DOCUMENTS

CN       1941913 A     4/2007
CN    101075949 A    11/2007

(Continued)

OTHER PUBLICATIONS

Cheng, W. et al., "A Method of Generating Trick Files From TS Stream File," vol. 5, No. 1, Jan. 2016, 7 pages.

(Continued)

*Primary Examiner* — Michael R Telan
(74) *Attorney, Agent, or Firm* — Alleman Hall & Tuttle LLP

(57) ABSTRACT

Embodiments of the present disclosure provide a method and an apparatus for playing back a video at a multiple-speed, an electronic device and a storage medium; where the method includes: obtaining first video data, where the first video data includes key frames and non-key frames; compressing the non-key frames of the first video data to generate second video data; and decoding the second video data to obtain decoded video data, and playing back the decoded video data at a multiple-speed according to a preset playback multiple-speed value. Since before decoding and playing back the first video data, the non-key frames of the first video data are compressed, and the compressed second video data is played at a multiple-speed, so as to reduce the decoding pressure for a device, avoid a lag when playing (Continued)

back the video at a multiple-speed and improve the smoothness of video playback at a multiple-speed.

20 Claims, 8 Drawing Sheets

(51) Int. Cl.
*H04N 19/172* (2014.01)
*H04N 19/70* (2014.01)

(56) References Cited

U.S. PATENT DOCUMENTS

| | | | |
|---|---|---|---|
| 2007/0291841 A1 | 12/2007 | Muraki et al. | |
| 2009/0074077 A1 | 3/2009 | Lakus-Becker | |
| 2009/0241163 A1* | 9/2009 | Seo | H04N 21/4331 725/139 |
| 2016/0294910 A1* | 10/2016 | Li | H04L 67/01 |
| 2018/0146221 A1 | 5/2018 | Bright-Thomas | |
| 2018/0255029 A1* | 9/2018 | Kim | H04N 21/23895 |

FOREIGN PATENT DOCUMENTS

| | | |
|---|---|---|
| CN | 101841692 A | 9/2010 |
| CN | 102771134 A | 11/2012 |
| CN | 103124380 A | 5/2013 |
| CN | 104869430 A | 8/2015 |
| CN | 107493482 A | 12/2017 |
| CN | 107801092 A | 3/2018 |
| CN | 109963176 A | 7/2019 |
| CN | 110266706 A | 9/2019 |
| CN | 112437345 A | 3/2021 |

OTHER PUBLICATIONS

China National Intellectual Property Administration, International Search Report and Written Opinion Issued in Application No. PCT/CN2021/128265, Dec. 28, 2021 WIPO, 13 pages.
China National Intellectual Property Administration, Office Action and Search Report Issued in Application No. 202011310156.1 Apr. 20, 2022, 13 pages.
China National Intellectual Property Administration, Office Action and Search Report Issued in Application No. 202011310156.1, Oct. 25, 2022, 14 pages.
China National Intellectual Property Administration, Notice of Grant Issued in Application No. 202011310156.1, Feb. 6, 2023, 2 pages.
Cheng, IW. et al., "A Method of Generating Trick Files From TS Stream File," vol. 5, No. 1, Jan. 2016, 7 pages.

* cited by examiner

METHOD AND APPARATUS FOR PLAYING BACK VIDEO AT MULTIPLE-SPEED, ELECTRONIC DEVICE AND STORAGE MEDIUM

CROSS-REFERENCE TO RELATED APPLICATIONS

The present application is a National Stage of International Application No. PCT/CN2021/128265, filed on Nov. 2, 2021, which claims priority to Chinese Patent Application No. 202011310156.1, filed on Nov. 20, 2020, both of the applications are hereby incorporated by reference in their entireties.

TECHNICAL FIELD

Embodiments of the present disclosure relate to the field of video image processing technology, and in particular, to a method and an apparatus for playing back a video at a multiple-speed, an electronic device and a storage medium.

BACKGROUND

With the development of mobile internet, a user demand for playing back a video on a terminal device is becoming increasingly strong and diverse. Playing back a video at a multiple-speed has become a popular demand in video playback software and devices.

At present, a process for playing back a video at a multiple-speed on a terminal device involves: first, decoding the video frame by frame, modifying presentation time stamps (Presentation Time Stamp, PTS) of video frames based on a multiple-speed setting, and then discarding frames that do not need to be played based on a playback frame rate to achieve the effect of a multiple-speed. This method requires decoding all frames of the video.

However, when playing back a high-quality video, such as, a 4K video, there is a problem of playback lag when playing back the video at a multiple-speed due to long decoding time.

SUMMARY

Embodiments of the present disclosure provide a method and an apparatus for playing back a video at a multiple-speed, an electronic device and a storage medium, to overcome the problem of playback lag when playing back a video at a multiple-speed.

In a first aspect, an embodiment of the present disclosure provides a method for playing back a video at a multiple-speed, which includes:
  obtaining first video data, where the first video data includes key frames and non-key frames;
  compressing the non-key frames of the first video data to generate second video data; and
  decoding the second video data to obtain decoded video data, and playing back the decoded video data at a multiple-speed according to a preset playback multiple-speed value.

In a second aspect, an embodiment of the present disclosure provides an apparatus for playing back a video at a multiple-speed, which includes:
  an obtaining unit, configured to obtain first video data, where the first video data includes key frames and non-key frames;
  a compressing unit, configured to compress the non-key frames of the first video data to generate second video data; and
  a playback unit, configured to decode the second video data to obtain decoded video data, and play back the decoded video data at a multiple-speed according to a preset playback multiple-speed value.

In a third aspect, an embodiment of the present disclosure provides an electronic device, which includes at least one processor and a memory; where
  the memory stores a computer execution instruction; and
  the at least one processor executes the computer execution instruction stored in memory to cause the at least one processor to execute the method for playing back a video at a multiple-speed of the first aspect and various possible designs in the first aspect.

In a fourth aspect, an embodiment of the present disclosure provides a computer-readable storage medium, in which a computer execution instruction is stored, when a processor executes the computer execution instruction, the method for playing back a video at a multiple-speed of the first aspect and various possible designs in the first aspect is implemented.

In a fifth aspect, an embodiment of the present disclosure provides a computer program product, including a computer program stored in a readable storage medium, at least one processor of an electronic device is capable of reading the computer program from the readable storage medium, and the at least one processor executes the computer program, to enable the electronic device to perform the method for playing back a video at a multiple-speed of the first aspect and various possible designs in the first aspect.

In a sixth aspect, an embodiment of the present disclosure also provides a computer program, where the computer program is stored in a readable storage medium, and at least one processor of an electronic device is capable of reading the computer program from the readable storage medium, and the at least one processor executes the computer program to enable the electronic device to perform the method for playing back a video at a multiple-speed of the first aspect and various possible designs in the first aspect.

The method and the apparatus for playing back a video at a multiple-speed, the electronic device and the storage medium are provided in embodiments of the present disclosure, where first video data is obtained, where the first video data includes key frames and non-key frames; the non-key frames of the first video data are compressed to generate second video data; and the second video data is decoded to obtain decoded video data, and the decoded video data is played back at a multiple-speed according to a preset playback multiple-speed value. Since before decoding and playing back the first video data, the non-key frames of the first video data are compressed, second video data with a lower frame rate is generated, and the compressed second video data is decoded and played at a multiple-speed, so as to reduce the decoding pressure for a device, avoid a lag when playing back the video at a multiple-speed and improve the smoothness of video playback at a multiple-speed.

BRIEF DESCRIPTION OF THE DRAWINGS

In order to more clearly describe the technical solution in embodiments of the present disclosure or the prior art, in the following, the drawings that need to be used in the description of the embodiments or the prior art will be briefly introduced. Apparently, the drawings in the following description are a part of the embodiments of the present disclosure. For persons of ordinary skill in the art, other drawings may also be obtained based on these drawings without paying creative effort.

DESCRIPTION OF EMBODIMENTS

In order to make the purpose, the technical solution, and the advantage of embodiments of the present disclosure clearer, the technical solution in embodiments of the present disclosure will be clearly and completely described below with reference to the accompanying drawings of the embodiments of the present disclosure. Apparently, the described embodiments are merely a part of rather than all the embodiments of the present disclosure. All other embodiments obtained by persons of ordinary skill in the art based on embodiments in the present disclosure without paying creative effort shall fall within the protection scope of the present disclosure.

Figure 1:
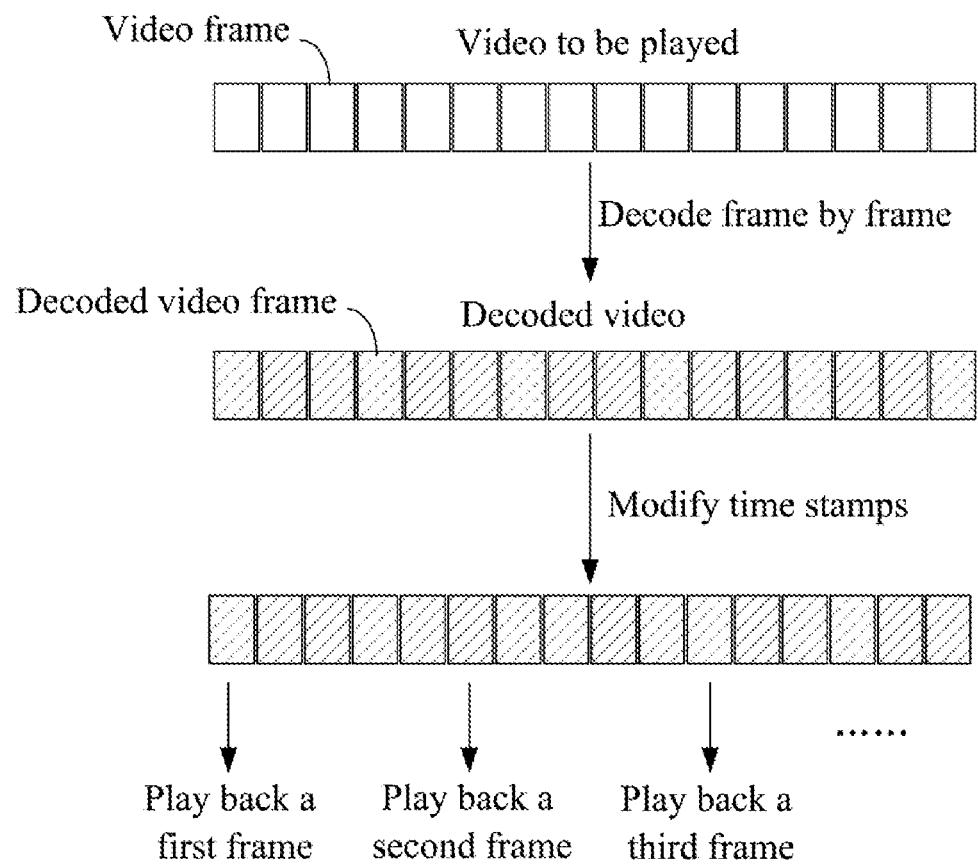
FIG. 1 is an example diagram of a process for playing back a video at a multiple-speed in the prior art.

FIG. 1 is an example diagram of a process for playing back a video at a multiple-speed in the prior art. In the prior art, referring to FIG. 1, a terminal device first decodes a video to be played frame by frame during a process for playing back the video at a multiple-speed, generates video decoded data including multiple decoded video frames, then modifies presentation time stamps of the decoded video frames based on a multiple-speed setting, and performs a playback according to the modified presentation time stamps. In order to achieve an effect of playback at a multiple-speed, it is necessary to discard video frames which do not need to be played when playing based on the modified presentation time stamps. However, since the discarded video frames are decoded video frames, the decoding process for these discarded video frames is wasted. Meanwhile, this method requires decoding all video frames. When playing back a high-quality video, such as, a 4K video, whose decoding time is too long, making it difficult to achieve real-time decoding when playing back the video at high-a multiple-speed, resulting in a problem of lag and not smooth of video playback at a multiple-speed.

An embodiment of the present disclosure provides a method for playing back a video at a multiple-speed to solve the above problem.

Figure 2:
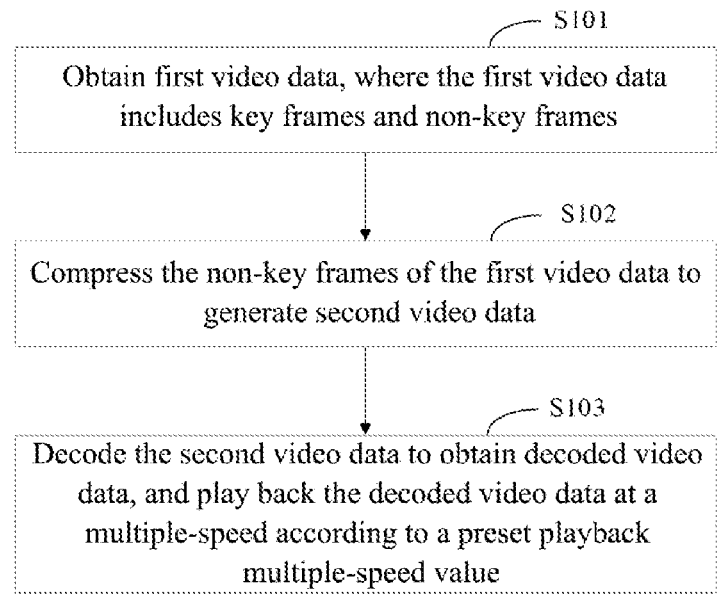
FIG. 2 is a flowchart I of a method for playing back a video at a multiple-speed provided by an embodiment of the present disclosure.

Referring to FIG. 2, FIG. 2 is a flowchart I of a method for playing back a video at a multiple-speed provided by an embodiment of the present disclosure. The method of this embodiment may be applied to a terminal device, such as, a smartphone, a tablet, etc. The method for playing back a video at a multiple-speed includes the following.

S101: obtain first video data, where the first video data includes key frames and non-key frames.

In an embodiment of the present disclosure, the first video data is video data to be played. In a possible implementation, the first video data may be an encoded video file, which may be stored in a terminal device executing the method for playing back a video at a multiple-speed provided in the embodiment of the present disclosure, or in a device capable of exchanging data with the terminal device, such as, a cloud server or another terminal device. The terminal device may access the cloud server or the other terminal device through a wired or wireless manner to obtain the first video data. In addition, there are no specific restrictions on the manner for obtaining the first video data, which may be set as needed.

Furthermore, after reading and unpacking the first video data, multiple video frames may be obtained. Among the multiple video frames of the first video data, there are the key frames and the non-key frames, where the key frames may also be referred to as reference frames, which refer to necessary video frames required for playing back the video data. Other video frames of the video need to refer to such key frames for positioning, so as to achieve playing back a video normally.

S102: compress the non-key frames of the first video data to generate second video data.

In the prior art, before playing back the video data, all video data is decompressed, i.e., it is equivalent to decoding the key frames and the non-key frames of the first video data and performing subsequent playback at a multiple-speed. However, during a process for playing back the video at a multiple-speed, only a part of the decoded video frames after being fully decoded were played, furthermore, as a playback multiple-speed increases, a number of decoded video to be used decreases, resulting in a significant waste of computing resources and making a computing power of the terminal device unable to meet a smooth playback requirement of a high-quality video at a high multiple-speed.

In an embodiment of the present disclosure, compression processing is performed on the non-key frames of the first video data, such as, reducing accuracies of the non-key frames of the first video data, deleting some or all of the non key frames, to achieve a goal for compressing a number of the non-key frames. Furthermore, second video data with lower amount of data is generated, a decrease in the number of non-key frames will not affect a normal playback of the video, but only cause a decrease in a frame rate of the second video data. However, as the steps in this embodiment are applied in the scene of playing back a video at a multiple-speed, as the video playback multiple-speed increases, even if there is a decrease in a frame rate, it will not create a video viewing obstacle for a user according to a principle of human vision. Therefore, when the second video data is played at a multiple-speed, it may achieve a similar visual performance by directly decoding and playing back the first video data. However, due to a smaller amount of data of the second video data, playing back the video at a multiple-speed is smoother and can effectively avoid lag.

S103: decode the second video data to obtain decoded video data, and play back the decoded video data at a multiple-speed according to a preset playback multiple-speed value.

Exemplarily, after obtaining the second video data with a smaller amount of data, it may obtain decoded video data corresponding to the second video data by decoding the second video data. Due to the smaller amount of data of the second video data compared to that of the first video data, through decoding the second video data, it may obtain the decoded video data at a faster speed and a smaller decoding load for a device.

In an embodiment of the present disclosure, the playback multiple-speed value is an adjustment coefficient for video playback speed. For example, if the playback multiple-speed value is 1, the second video data will be played at an original video speed; and if the playback multiple-speed value is 2, the second video data is played at twice the original video speed.

In an embodiment of the present disclosure, there is a mapping relationship between the playback multiple-speed value and a data size of the second video data. More specifically, when the playback multiple-speed value is large, an amount of data of corresponding second video data is smaller, that is, more non-key frames of the first video data are deleted; and when the playback multiple-speed value is small, an amount of data of corresponding second video data is larger, that is, less non-key frames of the first video data are deleted. By setting the second video data that matches the playback multiple-speed value, and decoding and playing back the second video at a multiple-speed, the video playback effect may be better improved, which takes into account both of smoothness and precision of the video, thereby avoiding lag and improving the smoothness of the video.

Figure 3:
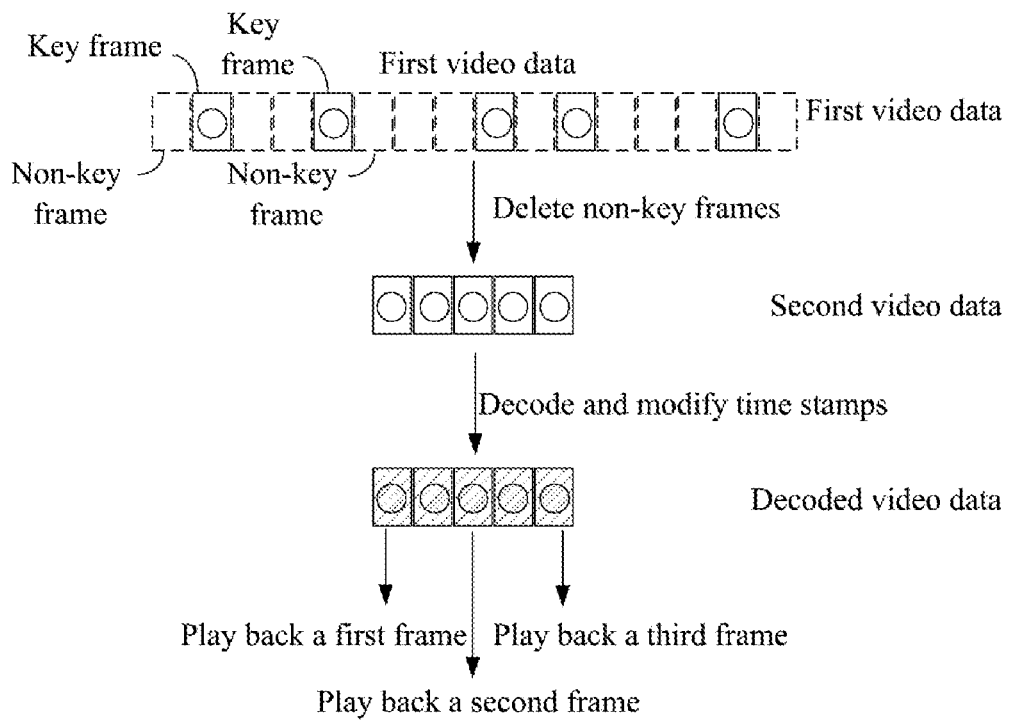
FIG. 3 is an example diagram of a process for playing back a video at a multiple-speed provided by an embodiment of the present disclosure.

FIG. 3 is an example diagram of a process for playing back a video at a multiple-speed provided by an embodiment of the present disclosure. Referring to FIG. 3, the method for playing back a video at a multiple-speed provided by this embodiment deletes non-key frames from the first video data to generate second video data with a smaller volume, decodes the second video data to generate decoded video data including multiple decoded video frames, and then plays back the decoded video data at a multiple-speed based on a multiple-speed setting. It is possible to improve the smoothness of video playback effectively.

In an embodiment of the present disclosure, first video data is obtained, where the first video data includes key frames and non-key frames; the non-key frames of the first video data are compressed to generate second video data; and the second video data is decoded to obtain decoded video data, and the decoded video data is played back at a multiple-speed according to a preset playback multiple-speed value. Since before decoding and playing back the first video data, the non-key frames of the first video data are compressed, second video data with a lower frame rate is generated, and the compressed second video data is decoded and played at a multiple-speed, so as to reduce the decoding pressure for a device, avoid a lag when playing back the video at a multiple-speed and improve the smoothness of video playback at a multiple-speed.

Figure 4:
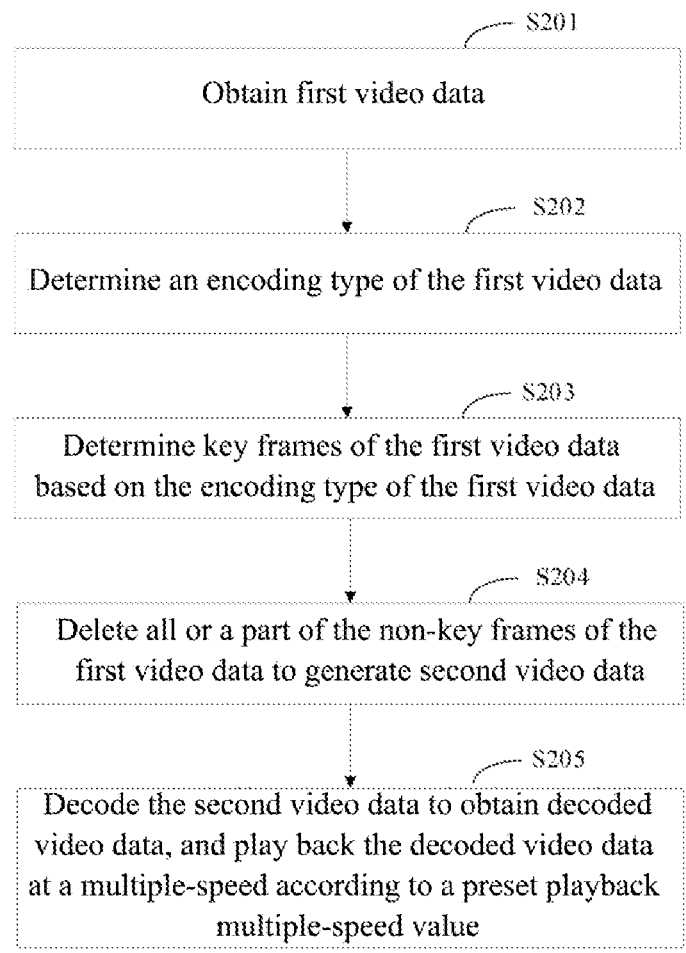
FIG. 4 is a flowchart II of a method for playing back a video at a multiple-speed provided by an embodiment of the present disclosure.

FIG. 4 is a flowchart II of a method for playing back a video at a multiple-speed provided by an embodiment of the present disclosure. Referring to FIG. 4, in this embodiment, a process for determining the key frames and the non-key frames is added after obtaining the first video data. The method for playing back a video at a multiple-speed includes the following.

S201: obtain first video data.

S202: determine an encoding type of the first video data.

In an embodiment of the present disclosure, the encoding type of the first video data includes various types, such as, H.261, H.264, H.265, etc. Different encoding types have their own encoding characteristics. After reading, unpacking, and other processes of the first video data, an encoding format thereof may be obtained. For example, an execution subject of the method for playing back a video at a multiple-speed provided in the embodiment of the present disclosure is a smartphone, and the first video data is an encoded video file stored in the smartphone. After reading the video file, the smartphone may obtain the encoding type of the video file, that is, the encoding type of the first video data. The specific method for reading the internal encoding type information of the video file is the prior art, which will not be repeated here.

S203: determine key frames of the first video data based on the encoding type of the first video data.

In an embodiment of the present disclosure, the encoding type of the first video data includes H.264 or H.265. The first video data includes multiple video frames, and each video frame includes one or more network abstraction layer (Network Abstraction Layer, NAL) units. A specific internal structure and an implementation manner of the NAL may be determined by referring to video encoding protocols such as H.264/H.265.

Figure 5:
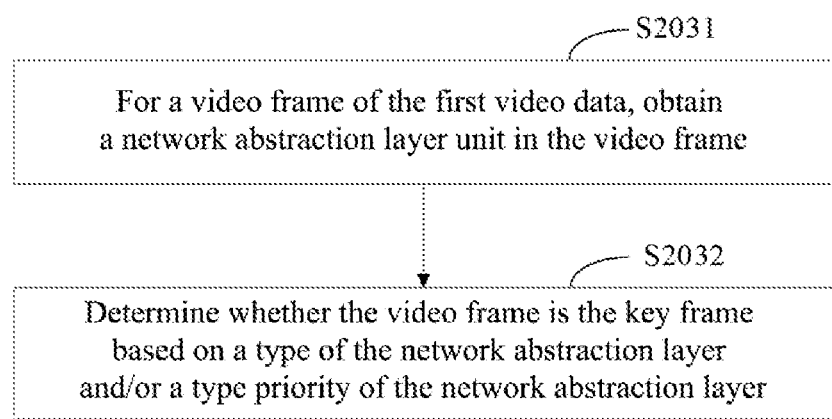
FIG. 5 is a flowchart of step S203 in the embodiment shown in FIG. 4.

Referring to FIG. 5, in this embodiment, step S203 includes two specific steps: S2031 and S2032.

S2031: for a video frame of the first video data, obtain a network abstraction layer unit in the video frame.

In an embodiment of the present disclosure, the video frame of this embodiment may be an AVPacket including video frame data, with each AVPacket including multiple NAL units. The AVPacket is a kind of data structure, more specifically, it is a kind of structure in an Ffmeg (Fast Forward Moving Picture Experts Group, Fast Forward Moving Picture Experts Group) that stores data after demultiplexing (demuxer) and before decoding (decode), which is still compressed data. At the same time, the AVPacket also includes some additional information about these data, such as a presentation time stamp, a decoding time stamp, a data duration, an index of a streaming media, etc. The method for obtaining the NAL based on the AVPacket is a prior art, which will not be repeated here.

S2032: determine whether the video frame is the key frame based on a type of the network abstraction layer and/or a type priority of the network abstraction layer.

In an embodiment of the present disclosure, when the encoding type of the first video data is H.264, if the type of the network abstraction layer is not supplemental enhancement information (i.e., NAL_Supplemental Enhancement Information, NAL_SEI), and the priority of the network abstraction layer is not 0, the video frame is the key frame; otherwise, the video frame is the non-key frame.

Specifically, this process includes traversing all NAL units in the AVPacket, sequentially or simultaneously resolving the type (type) and the priority of the NAL from the NAL units. If a type of a certain NAL is not NAL_SEI, and the priority of the NAL is not equal to 0, it indicates that the AVPacket is not a non-reference frame, that is, it is the key frame and cannot be dropped; otherwise, it may be dropped. Among them, there are various specific code implementation manners which may be implemented based on a specific development language, an operating system, and a specific requirement used. More specific limitations and examples will not be provided here.

In an embodiment of the present disclosure, when the encoding type of the first video data is H.265, if the type of the network abstraction layer is neither NAL_SEI nor a preset temporal sub-layer coding frame (i.e., Temporal Sub-layer Access, TSA), the video frame is the key frame; otherwise, the video frame is the non-key frame. Among them, the preset temporal sub-layer coding frame is a key temporal sub-layer coding frame (NAL_UNIT_TYPE_TSA_R).

More specifically, the NAL_UNIT_TYPE_TSA_R is a type of NAL, and the NAL also includes NAL_UNIT_TYPE_TSA_N type, where the character TSA_R means a reference (reference) frame of the TSA type, that is, the key frame; and the character TSA_N means a non-reference (non-reference) frame of the TSA type, that is, the non-key frame.

It should be emphasized here that among the relevant technologies, NAL_UNIT_TYPE_TSA_R type NAL is usually processed as a reference frame, i.e., a key frame, that is, the AVPacket which includes the NAL_UNIT_TYPE_TSA_R type NAL is used as a key frame of the video data. However, in a scene where the video is played at a multiple-speed, The AVPacket which includes NAL_UNIT_TYPE_TSA_R type NAL is deleted as a non-key frame, which will not affect the decoding of other data frames or the play back of the video at a multiple-speed. Additionally, due to a high proportion of AVPackets including the NAL_UNIT_TYPE_TSA_R type NAL in some videos, after deleting this AVPackets, it can release a large amount of space and further compress a size of the video data, leading a smaller volume of the generated second video data.

The process of determining the key frames when the encoding type of the first video data is H.265 is similar to the process of determining the key frames when the encoding type of the first video data is H.264, which will not be repeated here.

In an embodiment of the present disclosure, by analyzing the first video data with encoding types H.264 and H.265, it is determined whether the video frame of the first video data is a key frame. Since targeted analysis is performed based on the encoding characteristics of encoding types H.264 and H.265, the key frames of the first video data with encoding types H.264 and H.265 may be determined more appropriately, thereby achieving compression of the non-key frames of the first video data, improving the compression quality of the generated second video data, reducing a volume of the second video data, and ensuring the smoothness of playing back the second video data.

S204: delete all or a part of the non-key frames of the first video data to generate second video data.

In an embodiment of the present disclosure, exemplarily, after determining the key frames of the first video data, other video frames are non-key frames. In a possible implementation, all or a part of the non-key frames may be deleted, to generate the second video data with a smaller volume. Among them, exemplarily, a number of deleted non-key frames may be determined based on a preset playback multiple-speed value, a load of a terminal device, configuration information of the terminal device, a computing capability of the terminal device, and other parameters, which makes a volume of the second video data matches with the playback multiple-speed value and a situation of the terminal device, to achieve a better balance between smoothness and precision of the video.

It should be noted that the steps S203 and S204 in the embodiment of the present disclosure sequentially perform steps of determining the key frames, determining the non-key frames based on the key frames, and deleting the non-key frames. Meanwhile, in another possible implementation, similarity, in steps S203 and S204, the non-key frames may be determined directly and deleted. Because the video frames in the first video data only include two types: the key frames and the non-key frames, the determining of the key frames and the determining of the non-key frames occur simultaneously. Therefore, the scheme of directly determining and deleting the non-key frames in the aforementioned another possible implementation, is essentially the same as the implementation of steps S203 and S204 in the embodiment of the present disclosure, and the embodiment will not be repeated here.

S205: decode the second video data to obtain decoded video data, and play back the decoded video data at a multiple-speed according to a preset playback multiple-speed value.

In the embodiment of the present disclosure, steps S201 and S205 are consistent with steps S101 and S103 in the aforementioned embodiment. For detailed discussion, please refer to the discussion of steps S101 and S103, which will not be repeated here.

Figure 6:
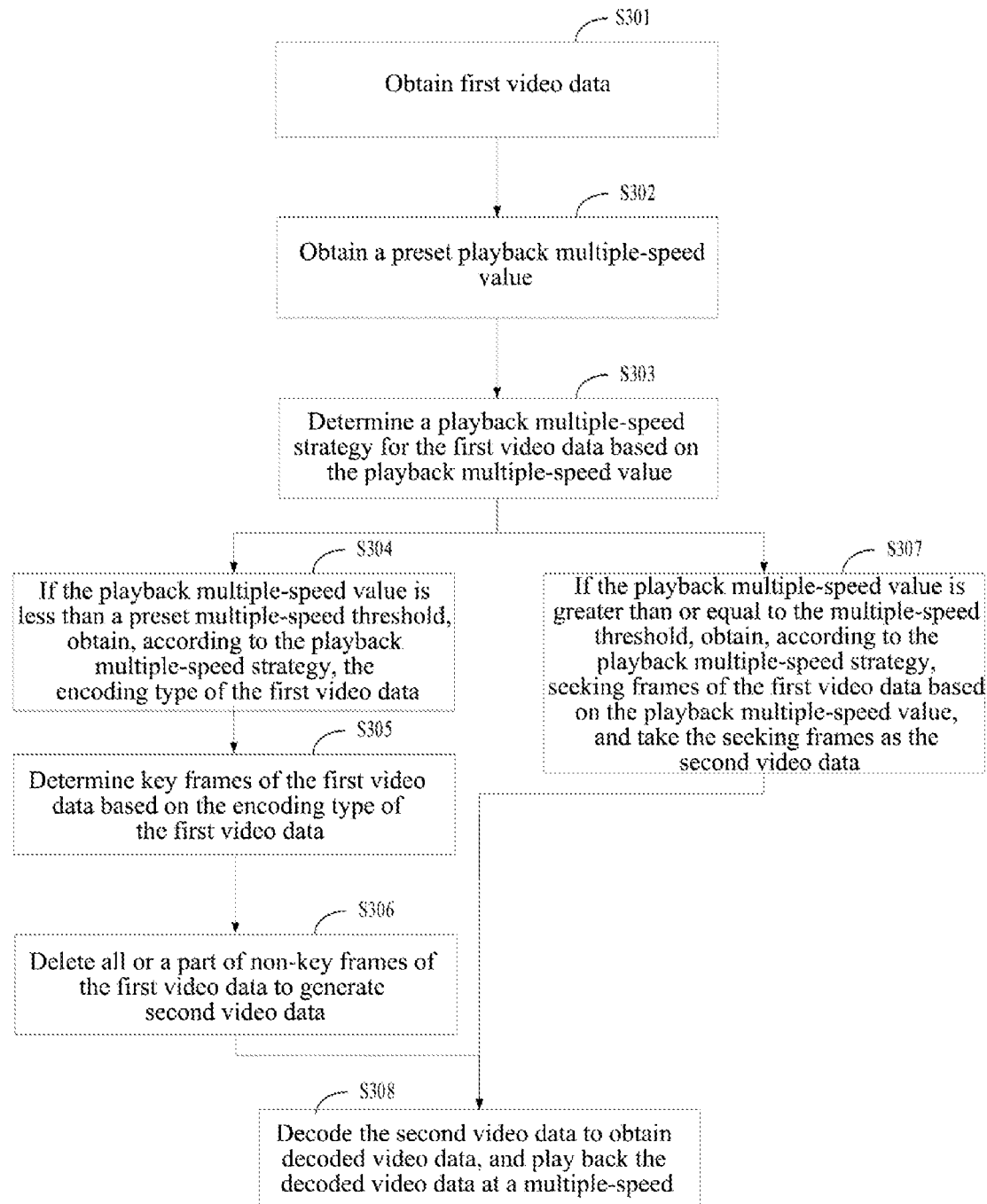
FIG. 6 is a flowchart III of a method for playing back a video at a multiple-speed provided by an embodiment of the present disclosure.

FIG. 6 is a flowchart III of a process of a method for playing back a video at a multiple-speed provided by an embodiment of the present disclosure. Referring to FIG. 6, in this embodiment, on the basis of the method for playing back a video at a multiple-speed shown in FIG. 4, determining a playback speed-multiple strategy for the first video data based on the preset playback multiple-speed value, as well as a step for playing back a video at a multiple-speed under a higher multiple-speed playback situation are added. The method for playing back a video at a multiple-speed includes the following.

S301: obtain first video data.

S302: obtain a preset playback multiple-speed value.

Figure 7:
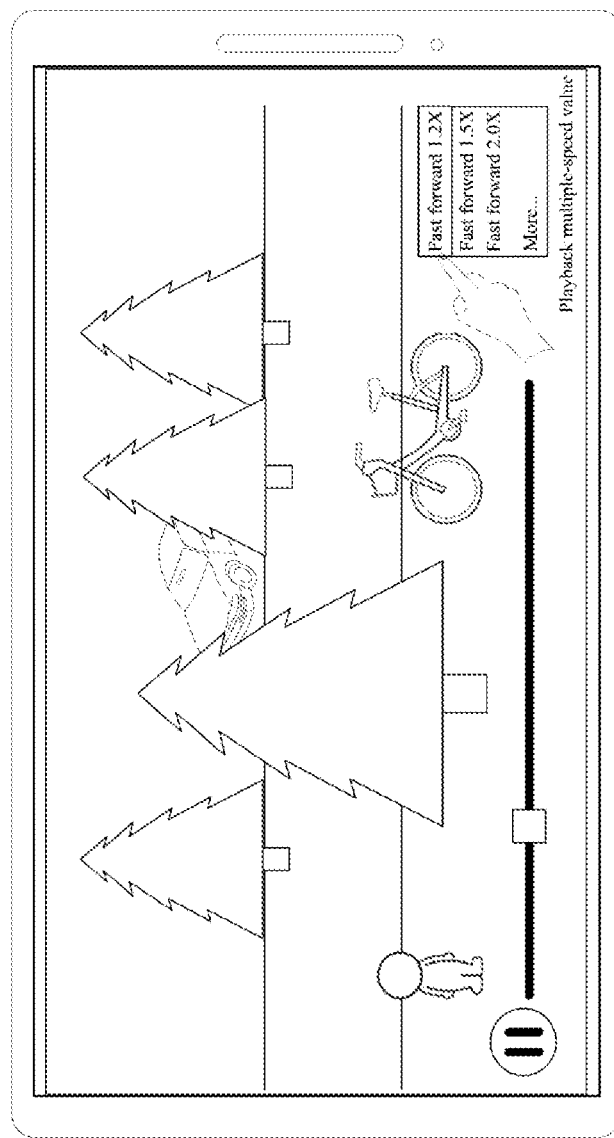
FIG. 7 is a schematic diagram of a user inputting a playback multiple-speed value through an interactive interface of a terminal device provided by an embodiment of the present disclosure.

In the embodiment of the present disclosure, the playback multiple-speed value is an adjustment coefficient for video playback speed, and the playback multiple-speed value may be preset by a user or obtained by receiving a user instruction through an interactive interface of a terminal device. FIG. 7 is a schematic diagram of a user inputting a playback multiple-speed value through an interactive interface of a terminal device provided by an embodiment of the present disclosure. Referring to FIG. 7, the terminal device is a smartphone which is equipped with a touch screen, and an interactive interface is displayed on the touch screen. The user, via the touch screen on the smartphone, clicks, touches, slips, or inputs the playback multiple-speed value through the interactive interface, and the terminal device simultaneously obtains the playback multiple-speed value through the interactive interface.

S303: determine a playback multiple-speed strategy for the first video data based on the playback multiple-speed value.

Figure 8:
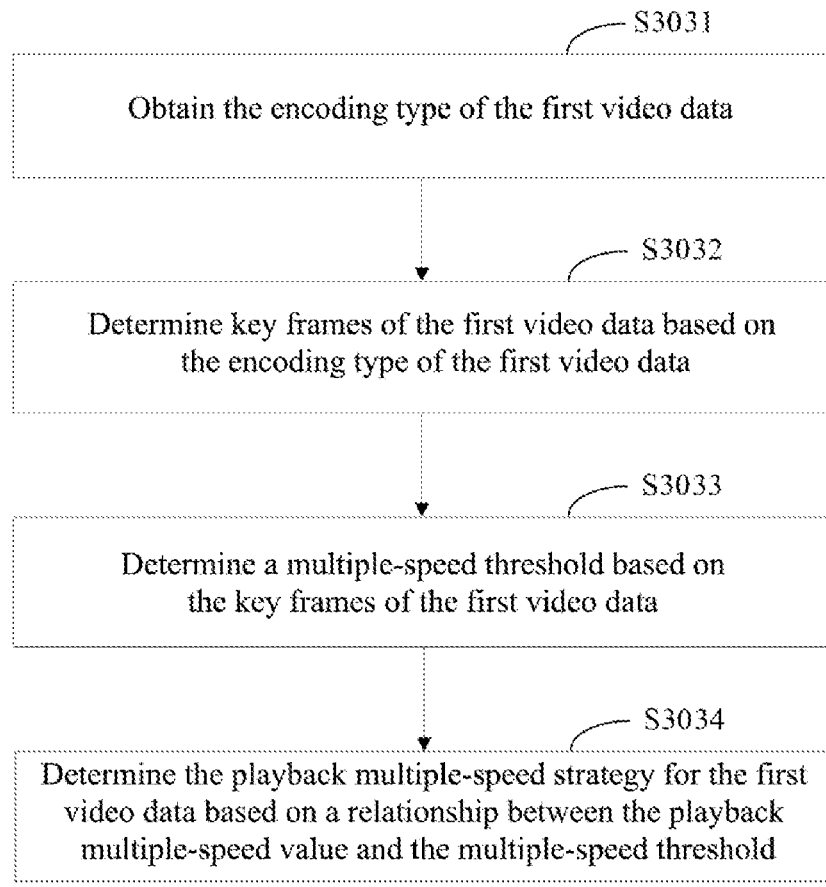
FIG. 8 is a flowchart of step S303 in the embodiment shown in FIG. 6.

Referring to FIG. 8, in this embodiment, step S303 includes four specific steps: S3031, S3032, S3033, and S3034.

S3031: obtain the encoding type of the first video data.

S3032: determine key frames of the first video data based on the encoding type of the first video data.

S3033: determine a multiple-speed threshold based on the key frames of the first video data.

In an embodiment of the present disclosure, the determining the multiple-speed threshold based on the key frames of the first video data specifically includes the following.

First, determining a number of all key frames of the first video data, and determining minimum video data based on the number of all key frames. Among them, the minimum video data is a set of video frames formed solely by key frames that can enable the first video data to be played normally.

Second, obtaining preset device information, where the device information is configured to represent a video processing capability of a terminal device playing the video. For example, hardware information of the terminal device, such as, including a device model, a CPU model, and memory information, and for another example, operating information of the terminal device, such as, including a current CPU usage rate, a remaining memory, a current temperature, and a current network signal strength. The device information herein may include one or more of the above examples, without specific limitations.

Third, calculating, based on the device information, a maximum multiple-speed coefficient, which is the multiple-speed threshold, for the terminal device to smoothly play back the minimum video data mentioned above. Specifically, the terminal devices corresponding to different device information have different maximum multiple-speed coefficients for the minimum video data that may be played smoothly. For example, a model A mobile phone has strong computing power and can play minimum video data corresponding to the first video data smoothly at a 10× speed; and a model B mobile phone has weak computing power and can play minimum video data corresponding to the first video data smoothly at 3× speed. More specifically, under the premise of determining the minimum video data, there is a specific mapping relationship between different device information and the maximum multiple-speed coefficient that can be played smoothly. Therefore, the maximum multiple-speed coefficient corresponding to the device information, namely the multiple-speed threshold, may be determined based on this mapping relationship.

Of course, it should be understood that in another possible implementation, the multiple-speed threshold may also be preset. For example, when the terminal device reads the first video data for the first time, the multiple-speed threshold is determined based on the above steps and is preset in the terminal device. When the terminal device reads the first video data for the second time, there is no need to determine the multiple-speed threshold again, but instead, using the multiple-speed threshold which is preset in the terminal device before. It may be set according to specific needs, and there are no specific restrictions here.

S3034: determine the playback multiple-speed strategy for the first video data based on a relationship between the playback multiple-speed value and the multiple-speed threshold.

Specifically, the multiple-speed threshold represents a maximum value that the terminal device can achieve when performing playback at a multiple-speed smoothly using a method of compressing the non-key frames of the first video data. Performing playback using a playback multiple-speed value that exceeds the multiple-speed threshold, even if all non-key frames of the first video data are deleted, there may still be lag due to device performance limitations. Here, other playback multiple-speed strategies need to be used for processing. For example, seeking (seek) playback on the first video data is performed, where a physical implementation for playback at a playback multiple-speed value exceeding the multiple-speed threshold is achieved through performing the seeking playback on the first video data, which will be explained in detail later.

In the embodiment of the present disclosure, steps S3031 and S3032 are consistent with steps S202 and S203 in the aforementioned embodiment. For detailed discussion, please refer to the discussion of steps S202 and S203, which will not be repeated here.

S304: if the playback multiple-speed value is less than a preset multiple-speed threshold, obtain, according to the playback multiple-speed strategy, the encoding type of the first video data.

S305: determine the key frames of the first video data based on the encoding type of the first video data.

S306: delete all or a part of the non-key frames of the first video data to generate the second video data.

S307: if the playback multiple-speed value is greater than or equal to the preset multiple-speed threshold, obtain, according to the playback multiple-speed strategy, seeking frames of the first video data based on the playback multiple-speed value, and take the seeking frames as the second video data.

Figure 9:
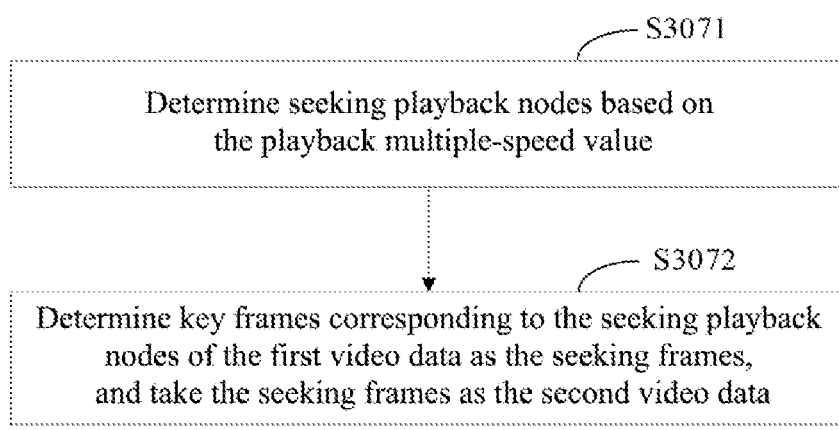
FIG. 9 is a flowchart of step S307 in the embodiment shown in FIG. 6.

Referring to FIG. 9, in this embodiment, step S307 includes two specific steps: S3071 and S3072.

S3071: determine seeking playback nodes based on the playback multiple-speed value.

S3072: determine key frames corresponding to the seeking playback nodes of the first video data as the seeking frames, and take the seeking frames as the second video data.

The seeking playback nodes are configured to represent presentation time stamps corresponding to video frames used for playback when seeking playback is performed on the first video data based on the playback multiple-speed value.

In order to better introduce the process of seeking playback, a more specific embodiment will be provided below.

Figure 10:
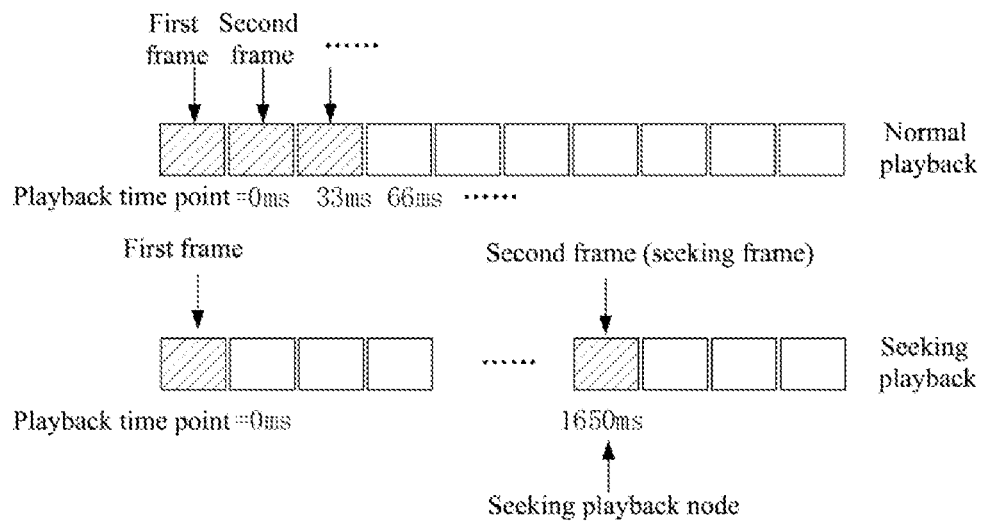
FIG. 10 is a schematic diagram of a process for seeking playback based on a seeking playback node provided by an embodiment of the present disclosure.

FIG. 10 is a schematic diagram of a process for seeking playback based on a seeking playback node provided by an embodiment of the present disclosure. Referring to FIG. 10, for example, the preset playback multiple-speed value is 50, which means playing back at a 50× speed, time of a current playback frame is 0ms, and a corresponding video frame is 0ms. Under normal playback, the playback speed is 30 frames/seconds. So time of a next frame required to be played should be 33 ms, and a seeking playback node for the next frame to be played is 33 ms*50=1650 ms based on calculating 50× rate. At this situation, if decoding till to this time frame by frame, it must be very slow. Therefore, when playing back for 0ms, the seeking playback node for the next video frame to be played back is calculated, that is, a time point may be directly sought (seek) to the seeking playback node of 1650 ms to obtain a key frame at that position or determine a closest key frame to that position as the seeking frame, and the seeking frame may be decompressed and played as the second video data. At the same time, since video frames between 0ms and 1650 ms do not require decoding, all key frames and non-key frames between 0ms and 1650 ms may be ignored, thereby further reducing an amount of data of the second video data composed of seeking frames. Due to a number of the key frames of the first video data is fixed, it may cause the video not to be played normally by deleting the key frames. Therefore, there is a compression upper limit for compressing of the non key frames of the first video data, that is, deleting all non-key frames and only retaining the most basic key frames for subsequent decompression and playback. However, in a scene of playback at a high multiple-speed, there is a limit to a computing power of the terminal device that plays back the video. After exceeding a certain multiple-speed, even if the first video data only includes the key frames, the terminal device will inevitably encounter a problem of being unable to decode in real-time, leading to video playback lag in the scene of playback at a high multiple-speed. In the embodiment of the present disclosure, preset device information is obtained, an upper limit of a multiple-speed (i.e., the multiple-speed threshold) at which the terminal device can smoothly play back the first video data after maximum compression based on the device information is determined, and a video playback strategy is used for playback after compressing non-key frames of the first video data when the threshold is not exceeded, which ensures that the video can be played back at an accurate multiple-speed; while a seeking playback strategy is used after exceeding this threshold, which ensures that the video may be played back smoothly. Thus, regardless of the multiple-speed of the video, the video can be played smoothly without any lag.

Meanwhile, compared to a conventional video playback strategy and the multiple-speed playback strategy provided in the embodiment shown in FIG. 4 of the present disclosure, due to an uneven spacing between the key frames, there may be inaccurate playback time points during seeking playback, which affects the smoothness of video playback. However, in the scene of playback at a high multiple-speed, such issue is covered by a high-speed playback of the video, and the higher the playback multiple-speed value, the less obvious the issue. Therefore, by determining the multiple-speed threshold based on the key frames of the first video data in the above steps and using the multiple-speed threshold as a boundary to determine different playback multiple-speed strategies, the issues of inaccurate playback time points caused by using seeking playback in the scene of playback at a high multiple-speed and affecting the smoothness of video playback may be minimized to a greatest extent; meanwhile, in the scene of playback at a low multiple-speed, by compressing the non-key frames of the first video data, inaccurate video playback time nodes are avoided, while improving the smoothness of video playback and avoiding lag.

S308: decode the second video data to obtain the decoded video data, and play back the decoded video data at a multiple-speed.

In the embodiment of the present disclosure, steps S304-S306 and S308 are consistent with steps S202-S205 in the aforementioned embodiment. For detailed discussion, please refer to the discussion of steps S202-S205, which will not be repeated here.

Figure 11:
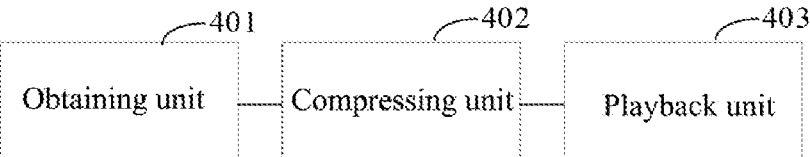
FIG. 11 is a structural block diagram of an apparatus for playing back a video at a multiple-speed provided by an embodiment of the present disclosure.

Corresponding to the method for playing back a video at a multiple-speed of the above embodiments, FIG. 11 is a structural block diagram of an apparatus for playing back a video at a multiple-speed provided by an embodiment of the present disclosure. For the convenience of explanation, only parts related to embodiment of the present disclosure are shown. Referring to FIG. 11, the apparatus for playing back a video at a multiple-speed 400 includes an obtaining unit 401, a compressing unit 402, and a playback unit 403, where, the obtaining unit 401 is configured to obtain first video data, where the first video data includes key frames and non-key frames;

the compressing unit 402 is configured to compress the non-key frames of the first video data to generate second video data; and the playback unit 403 is configured to decode the second video data to obtain decoded video data, and play back the decoded video data at a multiple-speed according to a preset playback multiple-speed value.

In an embodiment of the present disclosure, the key frames are used to represent necessary video frames required for playing video data, and the obtaining unit 401 is further configured to:
obtain an encoding type of the first video data; and
determine the key frames of the first video data based on the encoding type of the first video data.

In an embodiment of the present disclosure, the encoding type of the first video data includes H.264 or H.265, and the first video data includes multiple video frames to be processed, and each video frame to be processed includes one or more network abstraction layer units. When determining the key frames of the first video data, the obtaining unit 401 is specifically configured to:
for a video frame of the first video data, obtain a network abstraction layer unit in the video frame; and determine whether the video frame is the key frame based on a type of the network abstraction layer and/or a type priority of the network abstraction layer.

In an embodiment of the present disclosure, when the encoding type of the first video data is H.264, if the type of the network abstraction layer is not supplemental enhancement information, and the priority of the network abstraction layer is not 0, the video frame is the key frame; otherwise, the video frame is the non-key frame.

In an embodiment of the present disclosure, when the encoding type of the first video data is H.265, if the type of the network abstraction layer is neither supplementary enhancement information nor a preset temporal sub-layer coding frame, the video frame is the key frame; otherwise, the video frame is the non-key frame.

In an embodiment of the present disclosure, the preset temporal sub-layer coding frame is a key temporal sub-layer coding frame.

In an embodiment of the present disclosure, the compressing unit 402 is specifically configured to:
delete all or a part of the non-key frames of the first video data to generate the second video data.

The obtaining unit 401, the compressing unit 402, and the playback unit 403 are sequentially connected. The apparatus for playing back a video at a multiple-speed 400 provided in this embodiment can execute the technical solution of the corresponding method embodiments as shown in FIG. 2 to FIG. 5. The implementation principles and technical effects thereof are similar, which will not be repeated here.

Figure 12:
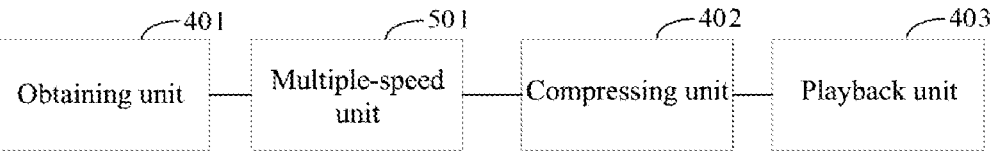
FIG. 12 is a structural block diagram of another apparatus for playing back a video at a multiple-speed provided by an embodiment of the present disclosure.

FIG. 12 is a structural block diagram of another apparatus for playing back a video at a multiple-speed provided by an embodiment of the present disclosure. The apparatus for playing back a video at a multiple-speed 500 shown in FIG. 12 adds a multiple-speed unit 501 to the apparatus for playing back a video at a multiple-speed 400 shown in FIG. 11.

In an embodiment of the present disclosure, the multiple-speed unit 501 is configured to obtain a playback multiple-speed value.

The compressing unit 402 is specifically configured to if the playback multiple-speed value is less than a preset multiple-speed threshold, compress the non-key frames of the first video data to generate the second video data; and if the playback multiple-speed value is greater than or equal to the multiple-speed threshold, obtain seeking frames of the first video data based on the playback multiple-speed value, and take the seeking frames as the second video data.

In an embodiment of the present disclosure, the compressing unit 402, when obtaining the seeking frames of the first video data based on the playback multiple-speed value, is specifically configured to: determine seeking playback nodes based on the playback multiple-speed value, where the seeking playback nodes are configured to represent presentation time stamps corresponding to video frames used for playback when seeking playback is performed on the first video data based on the playback multiple-speed value; and determine key frames corresponding to the seeking playback nodes of the first video data as the seeking frames.

In an embodiment of the present disclosure, the obtaining unit 401 is further configured to:
 obtain preset device information, where the device information is configured to represent a video processing capability of a terminal device playing the second video data; and determine the multiple-speed threshold based on the device information.

The multiple-speed unit 501 is respectively connected to the obtaining unit 401 and the compressing unit 402, and the playback unit 403 is connected to the compressing unit 402. The apparatus for playing back a video at a multiple-speed 500 provided in this embodiment can execute the technical solution of the corresponding method embodiments as shown in FIG. 6 to FIG. 9. The implementation principles and technical effects thereof are similar, which will not be repeated here.

Figure 13:
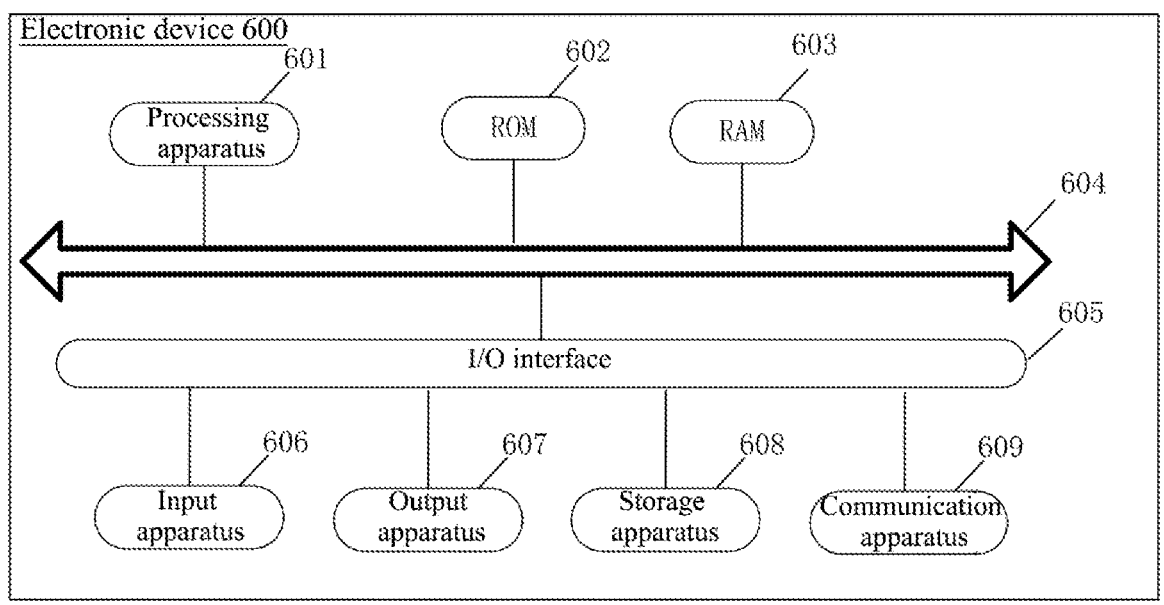
FIG. 13 is a schematic structural diagram of hardware of an electronic device provided by an embodiment of the present disclosure.

Referring to FIG. 13, it shows a schematic structural diagram of the electronic device 600 suitable for implementing the embodiments of the present disclosure. The electronic device 600 may be a terminal device or a server. The terminal device may include, but are not limited to, mobile terminals such as a mobile phone, a notebook computer, a digital broadcast receiver, a personal digital assistant (Personal Digital Assistant, PDA for short), a portable android device (Portable Android Device, PAD for short), a portable media player (Portable Media Player, PMP for short), a vehicle-mounted terminal (such as a vehicle navigation terminal), and stationary terminals such as a digital TV, a desktop computer. The electronic device 600 shown in FIG. 13 is only an embodiment, which should not impose any limitation on the function and applying scope of the embodiments of the present disclosure.

As shown in FIG. 13, the electronic device 600 may include a processing apparatus (e.g., a central processing unit, a graphics processor, etc.) 601, and the processing apparatus 601 may perform various appropriate actions and processing according to a program stored in a read only memory (Read Only Memory, ROM for short) 602 or a program loaded from a storage apparatus 608 into a random access memory (Random Access Memory, RAM for short) 603. Various programs and data necessary for the operation of the electronic device 600 are also stored in the RAM 603. The processing apparatus 601, ROM 602, and RAM 603 are connected to each other through a bus 604. And an input/output (I/O) interface 605 is also connected to the bus 604

Generally, the following apparatuses may be connected to the I/O interface 605: an input apparatus 606 including, for example, a touch screen, a touchpad, a keyboard, a mouse, a camera, a microphone, an accelerometer, a gyroscope, etc.; an output apparatus 607 including, for example, a liquid crystal display (Liquid Crystal Display, LCD for short), a speaker, a vibration, etc.; a storage apparatus 608 including, for example, a magnetic tape, a hard disk, etc.; and a communication apparatus 609. The communication apparatus 609 may allow the electronic device 600 to communicate wirelessly or by wire with other devices to exchange data. Although FIG. 13 shows the electronic device 600 having various apparatuses, it should be understood that not all of the illustrated apparatuses are required to be implemented or provided. More or fewer apparatuses may alternatively be implemented or provided.

Specially, according to an embodiment of the present disclosure, the processes described above with reference to the flowcharts may be implemented as a computer software program. For example, an embodiment of the present disclosure includes a computer program product including a computer program carried on a computer-readable medium, where the computer program includes program code for performing the method illustrated in the respective flowcharts. In such embodiment, the computer program may be downloaded and installed from a network via the communication apparatus 606, or installed from the storage apparatus 608, or installed from the ROM 602. When the computer program is executed by the processing apparatus 601, the above functions defined in the embodiments of the present disclosure are implemented.

An embodiment of the present disclosure also provides a computer program stored in a readable storage medium, from which one or more processors of an electronic device can read the computer program, and one or more processors execute the computer program, causing the electronic device to execute any of the solutions provided in the aforementioned embodiments.

It should be noted that the computer-readable medium described in the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer-readable storage medium may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in baseband or as part of a carrier wave, carrying computer-readable program code therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can send, propagate, or transmit the program used by or used in combination with the instruction execution system, apparatus or device. The program code included on the computer-readable medium may be transmitted through any suitable medium including, but not limited to, an electrical wire, an optical fiber cable, an RF (Radio Frequency), etc., or any suitable combination thereof.

The computer-readable medium may be included in the electronic device; and may also exist independently without being assembled into the electronic device.

The computer-readable medium carries one or more programs, and the one or more programs, when executed by an electronic device, cause the electronic device to execute the method shown in the above embodiments.

The computer program code for performing an operation of the present disclosure may be written in one or more programming languages or a combination thereof, where the above programming languages include an object-oriented programming language, such as Java, Smalltalk, and C++, as well as a conventional procedural programming language, such as "C" or similar programming languages. The program code may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (Local Area Network, LAN for short) or a wide area network (Wide Area Network, WAN for short), or may be connected to an external computer (e.g., connected via the Internet using an Internet service provider).

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in a succession may, in fact, be executed substantially concurrently, or the blocks may sometimes be executed in a reverse order, depending on the functionality involved. It should also be noted that each block of the block diagrams and/or flowcharts, or a combination of blocks in the block diagrams and/or flowcharts may be implemented with a special purpose hardware-based system that performs a specified function or operation, or may be implemented with a combination of special purpose hardware and a computer instruction.

The involved units described in embodiments of the present disclosure may be implemented by means of software, and may also be implemented by means of hardware. Names of these units do not constitute a limitation on the units per se under certain circumstances, for example, the first obtaining unit may also be described as "a unit for acquiring at least two Internet protocol addresses".

The foregoing functions described herein may be executed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the foregoing. More specific examples of machine-readable storage medium would include an electrical connection based on one or more wires, a portable computer disk, a hard disk, a random access memory (RAM), a read only memory (ROM), an erasable programmable read only memory (EPROM or flash memory), an optic fiber, a portable compact disk read only memory (CD-ROM), an optical storage device, a magnetic storage device, or any suitable combination of the foregoing.

In a first aspect, according to one or more embodiments of the present disclosure, a method for playing back a video at a multiple-speed is provided, which includes:

obtaining first video data, where the first video data includes key frames and non-key frames; compressing the non-key frames of the first video data to generate second video data; and decoding the second video data to obtain decoded video data, and playing back the decoded video data at a multiple-speed according to a preset playback multiple-speed value.

According to one or more embodiments of the present disclosure, the method further includes: obtaining an encoding type of the first video data; and determining the key frames of the first video data based on the encoding type of the first video data.

According to one or more embodiments of the present disclosure, the encoding type of the first video data includes H.264 or H.265; and the determining the key frames of the first video data includes: for a video frame of the first video data, obtaining a network abstraction layer unit in the video frame; and determining whether the video frame is the key frame based on a type of the network abstraction layer and/or a type priority of the network abstraction layer.

According to one or more embodiments of the present disclosure, when the encoding type of the first video data is H.264, if the type of the network abstraction layer is not supplemental enhancement information, and the priority of the network abstraction layer is not 0, the video frame is the key frame; otherwise, the video frame is the non-key frame.

According to one or more embodiments of the present disclosure, when the encoding type of the first video data is H.265, if the type of the network abstraction layer is neither supplementary enhancement information nor a preset temporal sub-layer coding frame, the video frame is the key frame; otherwise, the video frame is the non-key frame.

According to one or more embodiments of the present disclosure, the preset temporal sub-layer coding frame is a key temporal sub-layer coding frame.

According to one or more embodiments of the present disclosure, the compressing the non-key frames of the first video data to generate the second video data includes: deleting all or a part of the non-key frames of the first video data to generate the second video data.

According to one or more embodiments of the present disclosure, the method further includes: obtaining the playback multiple-speed value; the compressing the non-key frames of the first video data to generate the second video data includes: if the playback multiple-speed value is less than a preset multiple-speed threshold, compressing the non-key frames of the first video data to generate the second video data.

According to one or more embodiments of the present disclosure, the method further includes: if the playback multiple-speed value is greater than or equal to the multiple-speed threshold, obtaining seeking frames of the first video data based on the playback multiple-speed value, and taking the seeking frames as the second video data.

According to one or more embodiments of the present disclosure, the obtaining seeking frames of the first video data based on the playback multiple-speed value includes: determining seeking playback nodes based on the playback multiple-speed value, where the seeking playback nodes are configured to represent presentation time stamps corresponding to video frames used for playback when seeking playback is performed on the first video data based on the playback multiple-speed value; and determining key frames corresponding to the seeking playback nodes of the first video data as the seeking frames.

According to one or more embodiments of the present disclosure, the method further includes: obtaining preset device information, where the device information is configured to represent a video processing capability of a terminal device playing the second video data; and determining the multiple-speed threshold based on the device information.

In a second aspect, according to one or more embodiments of the present disclosure, an apparatus for playing back a video at a multiple-speed is provided, which includes:
- an obtaining unit, configured to obtain first video data, where the first video data includes key frames and non-key frames;
- a compressing unit, configured to compress the non-key frames of the first video data to generate second video data; and
- a playback unit, configured to decode the second video data to obtain decoded video data, and play back the decoded video data at a multiple-speed according to a preset playback multiple-speed value.

According to one or more embodiments of the present disclosure, the key frames are used to represent necessary video frames required for playing video data, and the obtaining unit is further configured to: obtain an encoding type of the first video data; and determine the key frames of the first video data based on the encoding type of the first video data.

In an embodiment of the present disclosure, the encoding type of the first video data includes H.264 or H.265, and the first video data includes multiple video frames to be processed, and each video frame to be processed includes one or more network abstraction layer units. When determining the key frames of the first video data, the obtaining unit is specifically configured to: for a video frame of the first video data, obtain a network abstraction layer unit in the video frame; and determine whether the video frame is the key frame based on a type of the network abstraction layer and/or a type priority of the network abstraction layer.

In an embodiment of the present disclosure, when the encoding type of the first video data is H.264, if the type of the network abstraction layer is not supplemental enhancement information, and the priority of the network abstraction layer is not 0, the video frame is the key frame; otherwise, the video frame is the non-key frame.

In an embodiment of the present disclosure, when the encoding type of the first video data is H.265, if the type of the network abstraction layer is neither supplementary enhancement information nor a preset temporal sub-layer coding frame, the video frame is the key frame; otherwise, the video frame is the non-key frame.

In an embodiment of the present disclosure, the preset temporal sub-layer coding frame is a key temporal sub-layer coding frame.

In an embodiment of the present disclosure, the compressing unit is specifically configured to: delete all or a part of the non-key frames of the first video data to generate the second video data.

In an embodiment of the present disclosure, the apparatus for playing back a video at a multiple-speed further includes a multiple-speed unit configured to obtain a playback multiple-speed value.

The compressing unit is specifically configured to if the playback multiple-speed value is less than a preset multiple-speed threshold, compress the non-key frames of the first video data to generate the second video data.

In an embodiment of the present disclosure, the compressing unit is further configured to: if the playback multiple-speed value is greater than or equal to the multiple-speed threshold, obtain seeking frames of the first video data based on the playback multiple-speed value, and take the seeking frames as the second video data.

In an embodiment of the present disclosure, the compressing unit, when obtaining the seeking frames of the first video data based on the playback multiple-speed value, is specifically configured to: determine seeking playback nodes based on the playback multiple-speed value, where the seeking playback nodes are configured to represent presentation time stamps corresponding to video frames used for playback when seeking playback is performed on the first video data based on the playback multiple-speed value; and determine key frames corresponding to the seeking playback nodes of the first video data as the seeking frames.

In an embodiment of the present disclosure, the obtaining unit is further configured to: obtain preset device information, where the device information is configured to represent a video processing capability of a terminal device playing the second video data; and determine the multiple-speed threshold based on the device information.

In a third aspect, according to one or more embodiments of the present disclosure, an electronic device is provided, which includes at least one processor and a memory; where,
- the memory store a computer execution instruction; and
- the at least one processor executes the computer execution instruction stored in memory to cause the at least one processor to execute the method for playing back a video at a multiple-speed of the first aspect and various possible designs in the first aspect.

In a fourth aspect, according to one or more embodiments of the present disclosure, a computer-readable storage medium is provided, in which a computer execution instruction is stored, when a processor executes the computer execution instruction, the method for playing back a video at a multiple-speed of the first aspect and various possible designs in the first aspect is implemented.

In a fifth aspect, an embodiment of the present disclosure provides a computer program product, including a computer program stored in a readable storage medium, at least one processor of an electronic device is capable of reading the computer program from the readable storage medium, and the at least one processor executes the computer program, to enable the electronic device to perform the method for playing back a video at a multiple-speed of the first aspect and various possible designs in the first aspect.

In a sixth aspect, an embodiment of the present disclosure also provides a computer program, where the computer program is stored in a readable storage medium, and at least one processor of an electronic device is capable of reading the computer program from the readable storage medium, and the at least one processor executes the computer program to enable the electronic device to perform the method for playing back a video at a multiple-speed of the first aspect and various possible designs in the first aspect.

The above descriptions are merely preferred embodiments of the present disclosure and illustrations of applied technical principles. The person skilled in the art should understand that a disclosure scope involved in the present disclosure is not limited to the technical solution formed by the specific combination of the above-mentioned technical features, and should also cover other technical solutions formed by any combination of the above technical features or their equivalents without departing from the above disclosure concept, for example, a technical solution formed by replacing the above features with the technical features with similar functions disclosed in the present disclosure (but not limited to the technical features with similar functions).

In addition, although operations are depicted in a particular order, it should not be understood as requiring these operations to be performed in the specific order shown or in the sequential order. Under a certain circumstance, multi-tasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in a language specific to a structural feature and/or a methodological action, it should be understood that the subject matter defined in the appended claims is not necessarily limited to the specific features or actions described above. On the contrary, the specific features and actions described above are merely example forms for implementing the claims.

What is claimed is:

1. A method for playing back a video at a multiple-speed, comprising:
    obtaining first video data, wherein the first video data comprises key frames and non-key frames;
    compressing the non-key frames of the first video data to generate second video data;
    decoding the second video data to obtain decoded video data, and playing back the decoded video data at a multiple-speed according to a preset playback multiple-speed value;
    wherein the method further comprises:
        obtaining the playback multiple-speed value;
    wherein the compressing the non-key frames of the first video data to generate the second video data comprises:
        if the playback multiple-speed value is less than a preset multiple-speed threshold, compressing the non-key frames of the first video data to generate the second video data;
        if the playback multiple-speed value is greater than or equal to the multiple-speed threshold, obtaining seeking frames of the first video data based on the playback multiple-speed value, and taking the seeking frames as the second video data.

2. The method according to claim 1, wherein the method further comprises:
    obtaining an encoding type of the first video data;
    determining the key frames of the first video data based on the encoding type of the first video data.

3. The method according to claim 2, wherein the encoding type of the first video data comprises H.264 or H.265; and the determining the key frames of the first video data comprises:
    for a video frame of the first video data, obtaining a network abstraction layer unit in the video frame;
    determining whether the video frame is the key frame based on a type of the network abstraction layer and/or a type priority of the network abstraction layer.

4. The method according to claim 3, wherein when the encoding type of the first video data is H.264, if a first condition is met, the video frame is the key frame; if the first condition is not met, the video frame is the non-key frame; wherein the first condition is that the type of the network abstraction layer is not supplemental enhancement information, and the priority of the network abstraction layer is not 0.

5. The method according to claim 3, wherein when the encoding type of the first video data is H.265, if a second condition is met, the video frame is the key frame; if the second condition is not met, the video frame is the non-key frame; wherein the second condition is that the type of the network abstraction layer is neither supplementary enhancement information nor a preset temporal sub-layer coding frame.

6. The method according to claim 5, wherein the preset temporal sub-layer coding frame is a key temporal sub-layer coding frame.

7. The method according to claim 1, wherein the compressing the non-key frames of the first video data to generate the second video data comprises:
    deleting all or a part of the non-key frames of the first video data to generate the second video data.

8. The method according to claim 1, wherein the obtaining seeking frames of the first video data based on the playback multiple-speed value comprises:
    determining seeking playback nodes based on the playback multiple-speed value, wherein the seeking playback nodes are used to represent presentation time stamps corresponding to video frames used for playback when seeking playback is performed on the first video data based on the playback multiple-speed value;
    determining key frames corresponding to the seeking playback nodes of the first video data as the seeking frames.

9. The method according to claim 1, wherein the method further comprises:
    obtaining preset device information, wherein the device information is used to represent a video processing capability of a terminal device playing the second video data; determining the multiple-speed threshold based on the device information.

10. An electronic device, comprising:
    one or more processors;
    a memory for storing one or more programs;
    wherein when the one or more programs are executed by the one or more processors, the one or more processors are enabled to:
        obtain first video data, wherein the first video data comprises key frames and non-key frames;
        compress the non-key frames of the first video data to generate second video data;
        decode the second video data to obtain decoded video data, and play back the decoded video data at a multiple-speed according to a preset playback multiple-speed value;

wherein the one or more processors are configured to:
obtain an encoding type of the first video data;
determine the key frames of the first video data based on the encoding type of the first video data;
wherein the encoding type of the first video data comprises H.264 or H.265; and the one or more processors are configured to:
for a video frame of the first video data, obtain a network abstraction layer unit in the video frame;
determine whether the video frame is the key frame based on a type of the network abstraction layer and/or a type priority of the network abstraction layer; wherein:
when the encoding type of the first video data is H.264, if a first condition is met, the video frame is the key frame; if the first condition is not met, the video frame is the non-key frame; wherein the first condition is that the type of the network abstraction layer is not supplemental enhancement information, and the priority of the network abstraction layer is not 0; and/or
when the encoding type of the first video data is H.265, if a second condition is met, the video frame is the key frame; if the second condition is not met, the video frame is the non-key frame; wherein the second condition is that the type of the network abstraction layer is neither supplementary enhancement information nor a preset temporal sub-layer coding frame.

11. The electronic device according to claim 10, wherein the one or more processors are configured to:
delete all or a part of the non-key frames of the first video data to generate the second video data.

12. The electronic device according to claim 10, wherein the one or more processors are configured to:
obtain the playback multiple-speed value;
if the playback multiple-speed value is less than a preset multiple-speed threshold, compress the non-key frames of the first video data to generate the second video data.

13. The electronic device according to claim 12, wherein the one or more processors are configured to:
if the playback multiple-speed value is greater than or equal to the multiple-speed threshold, obtain seeking frames of the first video data based on the playback multiple-speed value, and take the seeking frames as the second video data.

14. The electronic device according to claim 13, wherein the one or more processors are configured to:
determine seeking playback nodes based on the playback multiple-speed value, wherein the seeking playback nodes are used to represent presentation time stamps corresponding to video frames used for playback when seeking playback is performed on the first video data based on the playback multiple-speed value;
determine key frames corresponding to the seeking playback nodes of the first video data as the seeking frames.

15. The electronic device according to claim 12, wherein the one or more processors are configured to:
obtain preset device information, wherein the device information is used to represent a video processing capability of a terminal device playing the second video data;
determine the multiple-speed threshold based on the device information.

16. A non-transitory computer-readable storage medium having a computer execution instruction stored thereon, wherein a processor, when executing the computer execution instruction, is enabled to:
obtain first video data, wherein the first video data comprises key frames and non-key frames;
compress the non-key frames of the first video data to generate second video data;
decode the second video data to obtain decoded video data, and play back the decoded video data at a multiple-speed according to a preset playback multiple-speed value;
wherein the computer execution instruction is configured to be further executed by the processor specifically to:
obtain the playback multiple-speed value; and
if the playback multiple-speed value is less than a preset multiple-speed threshold, compress the non-key frames of the first video data to generate the second video data;
wherein the computer execution instruction is configured to be further executed by the processor specifically to:
obtain preset device information, wherein the device information is used to represent a video processing capability of a terminal device playing the second video data; and
determine the multiple-speed threshold based on the device information.

17. The non-transitory computer-readable storage medium according to claim 16, wherein the computer execution instruction is configured to be executed by the processor to:
obtain an encoding type of the first video data;
determine the key frames of the first video data based on the encoding type of the first video data.

18. The non-transitory computer-readable storage medium according to claim 17, wherein the encoding type of the first video data comprises H.264 or H.265; and the computer execution instruction is configured to be executed by the processor to:
for a video frame of the first video data, obtain a network abstraction layer unit in the video frame;
determine whether the video frame is the key frame based on a type of the network abstraction layer and/or a type priority of the network abstraction layer.

19. The non-transitory computer-readable storage medium according to claim 18, wherein:
when the encoding type of the first video data is H.264, if a first condition is met, the video frame is the key frame; if the first condition is not met, the video frame is the non-key frame; wherein the first condition is that the type of the network abstraction layer is not supplemental enhancement information, and the priority of the network abstraction layer is not 0; and/or
when the encoding type of the first video data is H.265, if a second condition is met, the video frame is the key frame; if the second condition is not met, the video frame is the non-key frame; wherein the second condition is that the type of the network abstraction layer is neither supplementary enhancement information nor a preset temporal sub-layer coding frame.

20. The non-transitory computer-readable storage medium according to claim 16, wherein the computer execution instruction is configured to be executed by the processor to:
if the playback multiple-speed value is greater than or equal to the multiple-speed threshold, obtain seeking frames of the first video data based on the playback multiple-speed value, and take the seeking frames as the second video data.

* * * * *